United States Patent [19]
Harty, Jr.

[11] 3,727,537
[45] Apr. 17, 1973

[54] AIR DISTRIBUTION UNIT

[75] Inventor: Millard Fillmore Harty, Jr., Bloomfield Hills, Mich.

[73] Assignee: Motor Wheel Corporation, Lansing, Mich.

[22] Filed: Aug. 25, 1971

[21] Appl. No.: 174,619

[52] U.S. Cl. ...................98/32, 98/40, 98/121, 62/259, 62/408
[51] Int. Cl. .............................................F24f 13/00
[58] Field of Search.......................62/DIG. 16, 259, 62/408; 98/121 R, 121 A, 40 R, 40 B, 40 C, 40 VM, 40 V, 40 N, 40 D, 40 DL, 32, 2.14, 33 R

[56] References Cited
UNITED STATES PATENTS

| | | | |
|---|---|---|---|
| 2,869,333 | 1/1959 | Hoiby | 62/239 |
| 3,315,488 | 4/1967 | Lind | 62/241 |
| 3,415,073 | 12/1968 | Ammons | 62/259 |
| 3,522,839 | 8/1970 | Wendt | 62/259 |

*Primary Examiner*—William J. Wye
*Attorney*—Barnes, Kisselle, Raisch & Choate

[57] ABSTRACT

An air distribution unit for use with an air conditioner for a motor or mobile home, travel trailer or the like wherein the air conditioner is mounted exteriorly on the roof and warm air is drawn from the space to be cooled through the ceiling into the air conditioner and then returned via a cool air supply duct to cool the space. The unit comprises a shroud having front, rear and side walls and an open upper end adapted for flush mounting against the ceiling. An S-shaped cool air distribution passageway extends within the shroud which registers with the outlet of the cool air supply duct leading from the air conditioner. An air deflector is movably disposed in said air distribution passageway to variably apportion the cool air between front and rear cooled air discharge outlets which in turn are controlled by multiple vane louver means adjustable about two axes. Lateral distribution of cool air is obtained through adjustable vane side outlets. The shroud includes a warm air return passageway which is isolated by internal partitions from the distribution passageway. The warm air intake is covered by a perforate, hinged grill which is readily removable for cleaning. The shroud also provides recessed mounting for the controls of the roof-mounted air conditioner unit, and is adapted to conform to various curvatures of the ceiling mounting surface through a center-line mounting arrangement.

26 Claims, 17 Drawing Figures

Patented April 17, 1973

INVENTOR
MILLARD F. HARTY, JR.
BY
Barnes, Kisselle, Raisch & Choate
ATTORNEYS

Patented April 17, 1973 3,727,537

INVENTOR
MILLARD F. HARTY, JR.
BY
Barnes, Kisselle, Raisch & Choate
ATTORNEYS

INVENTOR
MILLARD F. HARTY, JR.
BY
Barnes, Kisselle, Raisch & Choate
ATTORNEYS

AIR DISTRIBUTION UNIT

This invention relates to supply and return air distribution duct work for space coolers or heaters, and more particularly to an air distribution unit adapted for wall mounting, such as against a ceiling surface in a motor home, mobile home, travel trailer or similar installation, wherein an air heating unit or air conditioner is mounted on the outer surface or roof of the unit exteriorly of the structure containing the space to be heated or cooled and the air to be treated is withdrawn from the space and treated air returned to the space via ducts provided through the ceiling or other wall of the structure.

In mobile homes, motor homes, travel trailers and other mass-produced living units having a flat roof with a minimum space between the exterior roof surface and interior ceiling of the room space therebelow, it has been customary for the past several years to air condition such spaces with a conventional air conditioning unit adapted for a roof-mounted installation. Such an air conditioning unit is mounted on the roof exteriorly of the home in a suitable weather shroud and two roof ducts are provided, one for conducting warm air from the room space below the air conditioner up through the roof into the air conditioner cabinet for flow therein through the evaporator, and the other conducts the cooled air back through the roof back into the space to be cooled. These ducts usually are arranged closely adjacent one another and extend vertically. Accordingly, for efficient and controlled distribution of the cool air, as well as intake of the warm air, an air distribution unit is mounted within the space to be cooled and against the ceiling immediately below the air conditioner so as to cover the ceiling openings of the aforementioned return and supply ducts.

The present invention has for its objects the provision of an improved air distribution unit, and improved air deflector components therefor, for use in conjunction with through-wall ducts, particularly through-roof ducts of the aforementioned type, which are economical to manufacture, compact, lightweight, easy to service and clean, noise-free in operation and highly versatile in distributing and directing the cooled air received from the air conditioner and discharged into the space to be cooled.

Other objects, advantages and features of the present invention will become apparent from the following detailed description taken in conjunction with the following drawings wherein.

SHROUD AIR PASSAGEWAY STRUCTURE

Figure 7:
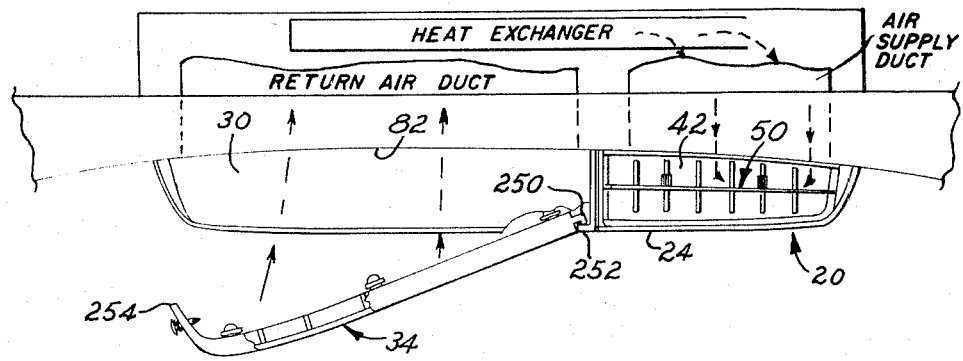
FIG. 7 is an elevational view of the front end of the unit illustrating the same mounted against a concave ceiling mounting surface, and with a hinged intake grill of the unit illustrated in a downwardly inclined partially open position.
Figure 8:
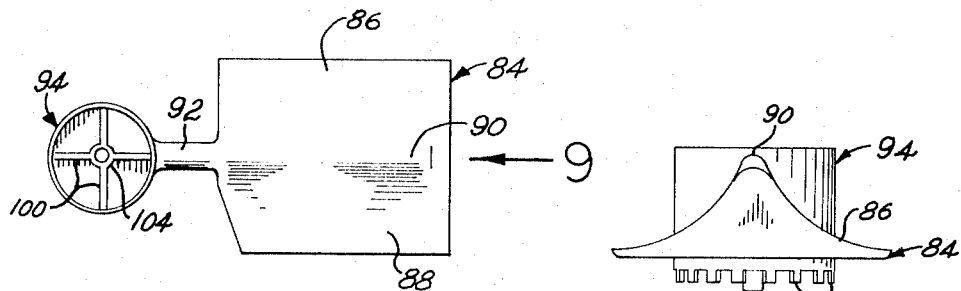
FIG. 8 is a top plan view of an adjustable air deflecting paddle used in the unit but shown by itself.

Referring in more detail to the accompanying drawings, an illustrative but preferred embodiment of an air distribution unit 20 is illustrated as it appears from the exterior thereof in FIGS. 1 through 5. The principal component of the unit is a generally rectangular, shallow box-like shroud 22 which is preferably injection molded in one piece from a suitable plastic material, such as high-impact styrene. Shroud 22 thus has a generally flat exterior wall 24 which, when unit 20 is mounted against the ceiling mounting surface as shown in FIG. 7, becomes the bottom wall of the shroud. Wall 24 is joined through a relatively large radius transition to a pair of juxtaposed and parallel side walls 26 and 28. The opposite ends of the shroud are partially closed by front and rear end walls 30 and 32, respectively, which are disposed parallel to one another and located diagonally opposite one another lengthwise of the shroud.

Figure 6:
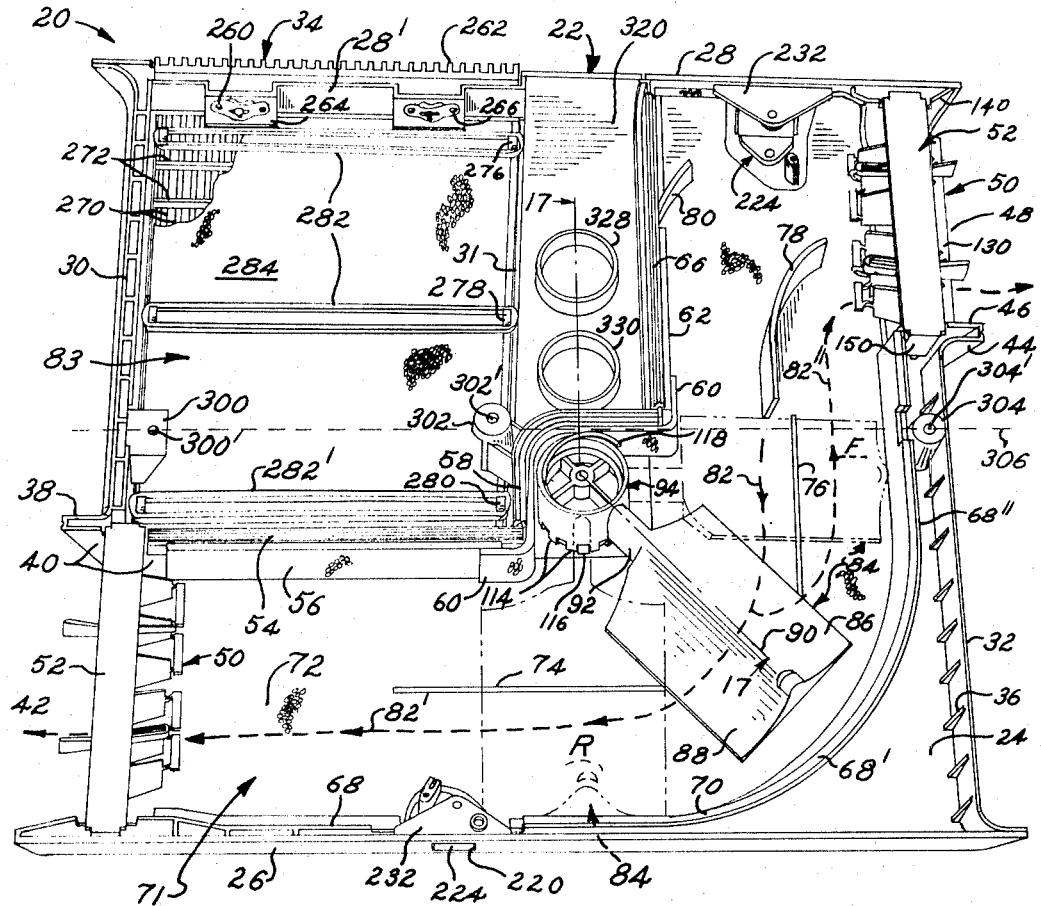
FIG. 6 is a perspective view of the air distribution unit looking down from above into the open upper end of the unit showing the details of the internal structure of the unit.

As best seen in FIG. 6 (which is a perspective view looking down from above through the open upper end of shroud 22), end wall 30 preferably is a hollow box section wall to provide improved beam strength adjacent the return air intake opening 31 formed in wall 24 of the shroud, opening 31 being occupied by hinged and removable grill 34. Wall 32 is reinforced by a series of integral gussets 36 (FIG. 6). Wall 30 terminates short of side wall 26 in an outwardly directed flange 38 which is joined to an inner upright partition 40 extending parallel to wall 26 and spaced therefrom to define a cooled air front discharge outlet 42 of the shroud. Likewise, wall 32 terminates at a flange 44 joined to a short upright partition 46 spaced from side wall 28 to define a rearwardly directed cooled air discharge outlet 48. Each of these outlets 42 and 48 contains a one-piece multiple vane louver assembly 50 removably retained therein by a keeper bridge 52, as explained in more detail subsequently herein in conjunction with FIGS. 10, 11 and 12.

Figure 17:
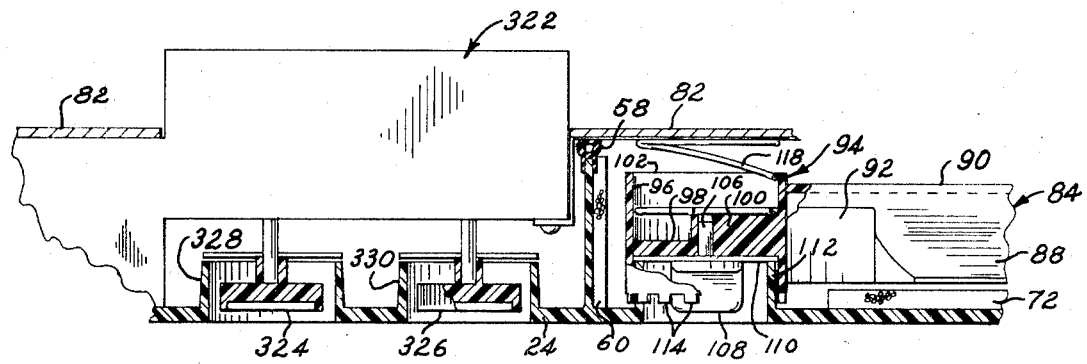
FIG. 17 is a fragmentary part sectional view taken generally along the line 17—17 of FIG. 6, but illustrating the parts of the air distribution unit mounted against the ceiling mounting surface, and also showing an associated electrical junction and control box of the air conditioner received in nested relation within a control chamber of the air distribution unit.

Partition 40 is only partially visible in FIG. 6 because its upper edge is covered by a split rubber sealing gasket 54 and its side surface by a strip 56 of sound-deadening material, such as polyurethane foam. However, partition 40 extends parallel to wall 26 toward rear wall 32 to a point just short of the center of the shroud where it connects to a right-angle partition 57 (FIGS. 6 and 17) likewise having a rubber gasket 58 affixed to its upper edge and covered by a strip of foam 60. The right-hand end of strip 60 (as viewed in FIG. 6) overlaps another insulating strip 62 affixed to the side surface of an upright partition 64 which extends perpendicular to partition 40 over to a junction with side wall 28. The upper edge of partition 64 likewise carries a rubber sealing strip 66 thereon. Another interior partition 68 extends upwardly from bottom wall 24, beginning at the left edge of side wall 26 as viewed in FIG. 6 and running generally parallel thereto toward end wall 32 into a curved portion 68' which in turn leads to a portion 68'' extending generally parallel to wall 32 and terminating at the interior end of flange 46. Partition 68 also has a strip of foam insulating material 70 adhered to the inner surface thereof.

Thus it will be seen that partitions 40 and 64, in conjunction with the right-angle center connecting partition 57 and the portion of side wall 28 between partition 64 and outlet 48, form one side wall of a generally S-shaped cooled air distribution passageway 71 extending within shroud 22, the other side wall of this passageway being defined by partition 68'–68''. The bottom wall of this passageway is formed by exterior wall 24 and its interior surface is also covered with a layer of foam sound-deadening material 72. Strengthening ribs 74 and 76 are provided centrally of this passageway which protrude a short distance upwardly from the interior surface of wall 24. In addition, non-movable curved air deflector vanes 78 and 80 are provided in the middle and near the outer edge of the rear curve of passageway 71 as it approaches rear outlet 48 in order to help direct the flow of cooled air toward outlet 48. The upper wall of passageway 71 is formed by the mounting template or other structure affixed to the ceiling of the room to which unit 20 is attached, as indicated by the mounting surface 82 shown in FIG. 7.

The generally rectangular space defined between partition 40, side wall 28, partition 64 and front wall 30 communicates with the return air intake opening 31 via grill 34 and forms a return air passageway 83 extending upwardly through the shroud. Passageway 83 is isolated from the passageway 71 by the interior partitions 40, 57 and 64 and their associated gaskets 54, 58 and 66, these gaskets being adapted to resiliently and sealably engage surface 82 in the mounted position of unit 20. In this position, the rectangular warm air return duct in surface 82 (not shown) leading upwardly from the ceiling into the air conditioner cabinet registers with passageway 83 in vertical alignment with grill 64 so that air is drawn from the space immediately below the grill, and hence from adjacent the ceiling of the structure, upwardly through grill 64, thence through passageway 83 and into the return air ceiling duct. The warm air then flows through the evaporator of the air conditioner and thence into the cool air supply duct (not shown) leading back down through the ceiling. The cool air supply duct is also rectangular and is aligned with the central portion of passageway 71, preferably between bend 68' of partition 68 and the right-angle partition 57, as described in more detail subsequently herein, so that cooled air flowing downwardly enters passageway 71 generally along the path indicated by the dashed line 82 in FIG. 6 for flow along one or both of the paths 82' and 82''.

FRONT-REAR AIR APPORTIONMENT

Figure 9:
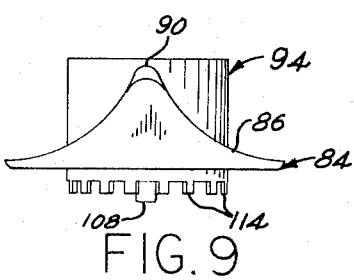
FIG. 9 is an end elevational view of the air deflector as viewed looking in the direction of the arrow in FIG. 8.

In accordance with another feature of the present invention, air deflector means are provided centrally in passageway 71, preferably comprising a paddle 84 which is generally V-shaped in cross section as best seen in FIG. 9. Paddle 84 has concave upper surfaces 86 and 88 converging at a vertex 90 which forms a continuation of an arm 92 which in turn is joined integrally to and projects radially outwardly from a hub 94. Hub 94 comprises a cylindrical wall 96 (FIGS. 6, 8, 9 and 17) having a transverse central partition 98 reinforced by four radially extending internal ribs 100 disposed thereabove the upper edges of which are recessed below the upper edge 102 of wall 96. An inner hub 104 formed at the junction of ribs 100 receives with a force fit the stem 106 of a control knob 108 which is inserted into hub 94 via its open lower end. A disc bezel 110 may be interposed knob 108 and wall 98, if desired.

Figure 16:
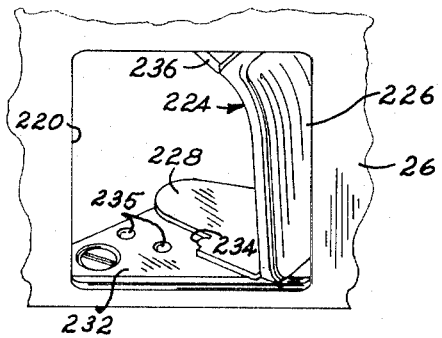
FIG. 16 is a fragmentary perspective view illustrating the deflector as viewed from the exterior of the unit when oriented upside down, i.e., as shown in FIGS. 1 or 5, with the deflector in open position.

Shroud 22 has an integral cylindrical hollow journal post 112 (FIG. 17) projecting upwardly from wall 24, located generally in the corner formed by partition 57, which is adapted to be telescopically received within the open, lower end of hub 94. The upper edge of post 112 abuts bezel 110 to thereby support the lower edge of hub 94 spaced above wall 24 and to pilot the hub for rotation about the axis of post 112. The lower edge of hub 94 has a series of teeth 114 projecting axially downwardly therefrom which provide notches therebetween adapted to be selectively engaged by a detent 116 (FIG. 6) which protrudes upwardly from wall 24 and radially outwardly from post 112. The upper open end of hub 94 receives a coil compression spring 118, the lowermost convolution of which seats on the upper edges of ribs 100. The upper convolution of spring 118 is adapted to abut the under surface of the ceiling mounting structure 82 (as shown in FIG. 16) when unit 20 is fastened thereto to thereby yieldably bias hub 94 downwardly onto post 112. The upper edge 102 of hub 94 is spaced from member 82 so that the hub can be raised a sufficient distance to deregister the detent 116 with the notches between teeth 114, the hub then being rotatable about the axis of post 112 to thereby pivot paddle 86 through an arc of approximately 90 degrees. Paddle 86 is thus movable from one extreme position indicated in phantom lines in FIG. 6 and labelled R, corresponding to the position at which all of the cooled air is directed to the rear discharge outlet 48, to another extreme position shown in phantom in FIG. 6 and labelled F, corresponding to the position in which the paddle directs all of the cooled air in front outlet 42. This front vs. rear air apportionment adjustment is accomplished by reaching up from beneath unit 22, manually grasping knob 108, pushing it upwardly and holding it so elevated while rotating the knob to the desired position, as indicated by the dial markings on the exterior surface of the control panel portion 24' of wall 24 shown in FIG. 3. Then when the knob is released, spring 118 biases it back to a detent engaged position to thereby hold paddle 84 in the selected angular position.

With the foregoing in mind, it will now be better understood that the cold air duct provided through the ceiling of the motor home or the like is preferably made rectangular and of a size and orientation such that vertex 90 of paddle 86 when positioned as shown in solid lines in FIG. 6 is coextensive with a line extending diagonally between opposite corners of the cool air duct, and thus is oriented at 45° to the sides of the duct. In this position, paddle 84 will have its vertex bisecting the duct so that half of the air is directed to the front outlet 42, as indicated by the dashed line 82' in FIG. 6, and the other half directed to the rear discharge outlet 48 as indicated by the dashed line 82'' in FIG. 6. Thus when paddle 84 is positioned as indicated in phantom at R, vertex 90 will be vertically aligned with the left edge of the ceiling outlet and therefore all of the air received therefrom will be directed toward outlet 48. Conversely, when the paddle is positioned in position F, vertex 90 will be aligned with the edge of the outlet at 90 degrees to the aforementioned edge and hence all of the air received therefrom will be directed to the front outlet 42. Paddle 84 thus serves in extreme positions not only as a deflector but as a baffle limiting flow to one direction in passageway 71. Between its extreme positions, paddle 84 variably apportions the flow of air, for example, half to the front and half to the rear when in mid-position, two-thirds/one-third when suitably positioned closer to the F position, and so on.

MULTIPLE-VANE FRONT AND REAR AIR LOUVER

Figure 10:
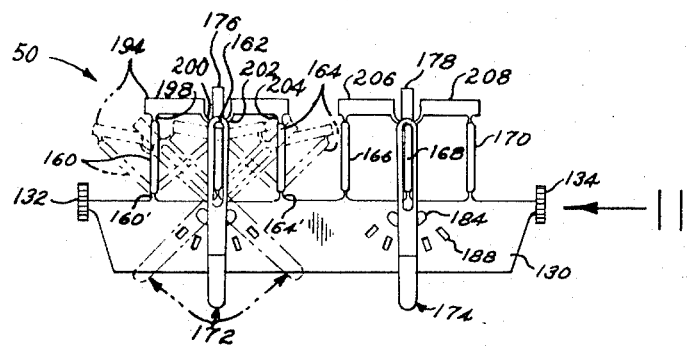
FIG. 10 is a top plan view of an improved adjustable multiple vane louver for the discharge outlets of the air distribution unit, the lower being shown by itself.
Figure 11:
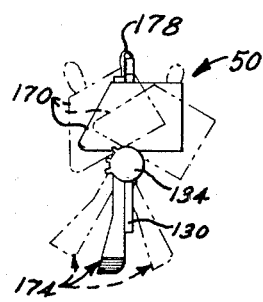
FIG. 11 is an end elevational view of the louver as viewed looking in the direction of the arrow in FIG. 10.
Figure 12:
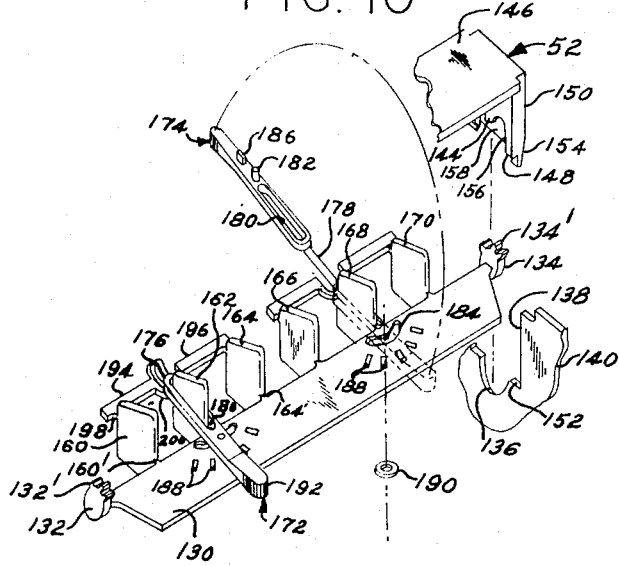
FIG. 12 is a perspective view of the louver of FIGS. 10 and 11 with an exploded fragmentary showing of the associated shroud and bridge mounting structure for the louver.
Figure 13:
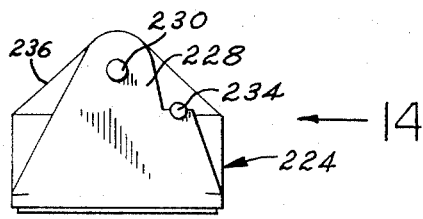
FIG. 13 is a top plan view of an improved deflector employed with the side discharge outlets of the air distribution unit.

In accordance with another feature of the present invention, the air discharged via front and rear outlets 42, 48 is directable within a given angular range, both horizontally and vertically by the manually adjustable multiple-vane louver 50 mentioned previously. The details of this louver 50 are best seen in FIGS. 10, 11 and 12, and the assembled relation of louver 50 is best seen in FIG. 6 taken in conjunction with FIGS. 1, 2 and 7. The multiple-vane louver assembly 50 comprises a main vane 130, the longitudinal axis of which is adapted to extend horizontally in the mounted position of the louver approximately halfway between the top and bottom walls of the associated outlets. Vane 130 has journal discs or hubs 132 and 134 at the opposite ends thereof. As shown in FIG. 12, disc 134 is adapted to slideably seat in a semi-circular recess 136 formed at the bottom of a notch 138 of a partition wall 140 (FIGS. 6 and 12) which is spaced inwardly from the side wall 28 to define one side of outlet 48. Partition 46 at the other side of outlet 48 likewise has a similar notch 138 and semi-circular recess 136 (not visible) to receive hub 132 thereon. Discs 132 and 134 each have a series of three teeth 132' and 134' respectively oriented to project generally upwardly when vane 130 is horizontal. These teeth serve in conjunction with a downwardly projecting rounded detent 144 provided on bridge keeper 52 to form a yieldable detent to maintain vane 130 in one of three selected positions; namely, horizontal, inclined upwardly or inclined downwardly.

Keeper 52 consists of a horizontal cross piece 146 adapted to overlie vane 130 as shown in FIG. 6 so as to be flush with the upper edges of the side and end walls of the shroud when the shoulders 148 provided on the inner side of the legs 150 of keeper 152 seat on the horizontal portions 152 of notch 138 flanking recess 136. In this position, the lowermost extremities 154 of legs 150 overlap the outer surfaces of partition 140 and partition 46 to prevent endwise motion keeper 52 in its seated condition. Legs 150 also have a semi-circular notched out portion 156 which, in conjunction with recess 136, completes a circular journal cavity for the discs or hubs 132, 134, respectively. Each leg 150 also has a wall 158 spaced beyond the associated hubs 132 and 134 to limit endwise movement of vane 130. Keeper 52 thus captures louver 50 to prevent bodily movement thereof in all directions. However, there is sufficient flexibility in the shroud so that it can flex when vane 130 is rotated about its longitudinal axis to allow detent 144 to move past teeth 132' and 134'. Accordingly, no biasing spring is needed in conjunction with this detent relationship.

Louver 50 also includes a series of auxiliary vanes 160, 162, 164, 166, 168 and 170 each individually connected by an integral "living hinge" portion 160', 162', 164', etc., to the interior edge of vane 130 for pivotal movement about an axis perpendicular to the rotational axis of vane 130. Preferably, the auxiliary vanes are arranged in two separate groups for motion in unison in each group. An adjustment arm 172 controls movement of the three vanes 160, 162 and 164, and an identical adjustment arm 174 controls the remaining three vanes 166, 168 and 170. Control arms 172, 174 are connected by thin, flexible strap portions 176 and 178 respectively to the interior edge of their associated central vanes 162 and 168 of the two sets of vanes. Each arm 172, 174 has a through-slot 180 adapted to receive therethrough the associated middle vane 162 or 168 when the arm is pivoted from a condition coplanar with vane 130 (as shown with respect to arm 174 in FIG. 10) 180 degrees to the assembled position of arm 172 shown in FIG. 12 wherein the underside of the arm rests flat against the upper surface of the main vane 130. In this assembled position, a dependent projecting pin 182 of the arm projects through an arcuate slot 184 in vane 130. Slot 184 is disposed immediately adjacent the mid-vane of the set to limit rotational movement of the arm about the axis of the living hinges 160', etc., to a range of approximately 90°. Each arm also has a dependent lug 186 adapted to register in its assembled position with a selected one of a plurality of slots 188 in vane 130 arranged in an arcuate row and extending radially of the axis of rotation of arm 184.

Preferably, the lower end of pin 182 after insertion through slot 184 receives a plastic washer 190 which, after being inserted on pin 182 and brought against the underside of vane 130, is retained on the pin by upsetting the lower end of pin 186, as by heat and pressure deformation thereof. This maintains associated arm 172 or 174 in its assembled condition, as shown with respect to arm 170. However, due to the flexible and resilient nature of the plastic material of which louver 50 is constructed as an integral unit, such as polypropylene, the free end 192 of the arm can be lifted upwardly to thereby bend the arm sufficiently to lift peg 186 out of its associated slot 188. While free end 192 is thus held upwardly away from vane 130, the control arm may be rotated to pivot the auxiliary vanes associated therewith to another selected angular position relative to vane 130 until peg 186 registers with another slot 188. Upon release of the arm, it will snap downwardly against the upper surface of the vane again registering peg 186 with a selected slot 188 and thereby retaining the auxiliary vanes in their new selected position.

Vanes 160 and 164 flanking central vane 162 are linked for parallel motion therewith by links 194 and 196 respectively, link 194 being connected by thin, flexible living hinge portions 198 and 200 (FIG. 10), and likewise vane 196 by living hinge portions 202 and 204, to the interior edges of vanes 162 and 164 respectively. A similar arrangement of hinged parallel links 206 and 208 is provided for vanes 166, 168 and 170 of the other set of auxiliary vanes. The motion of the vanes between their extreme limits of pivotal movement is illustrated in phantom in FIG. 10 in connection with the set of vanes 160–164. Likewise, the pivotal motion of vane 130 about a horizontal axis and the auxiliary vanes therewith about the rotational axis of vane 130 is illustrated by the phantom positions of louver 50 shown in FIG. 11.

The above one-piece construction of louver 50 permits all of the parts of the louver assembly, except for washer 190, to be molded in a one shot injection molding process as a one-piece unit with the hinge connections of the main and auxiliary louvers, as well as the control arms, all being molded at one time. Control arms 172 and 174 are molded with the arms oriented unfolded as arm 174 shown in FIG. 12 so that they can lie coplanar with vane 130 adjacent the mold parting line, which preferably is coextensive with the upper surface of vane 130. Considerable savings thus are obtained due to reduced mold and assembly costs, and very dependable, long-life and noise-free unit results which can take much abuse. In addition, louver 50 permits multidirectional control of the air flow from discharge outlets 42 and 48, allowing the airstream to be directed up and down as directed by vane 130, as well as diverted laterally in a fan pattern, or all to one side or the other, depending upon the individual adjustment of the auxiliary vane sets.

LATERAL AIR DIVERTERS

Air distribution unit 20, in accordance with another feature of the present invention, also has means for directing cool air from the main distribution passageway 71 laterally of shroud 22. Each side wall 26 and 28 of the shroud thus has a lateral discharge outlet 220 and 222 respectively (FIGS. 3, 4, 5 and 16) controlled by a combined closure and diverter vane 224.

Figure 14:
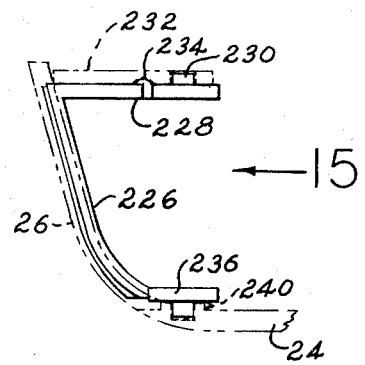
FIG. 14 is a side elevational view of the deflector of FIG. 13 with the associated shroud mounting structure shown in phantom.
Figure 15:
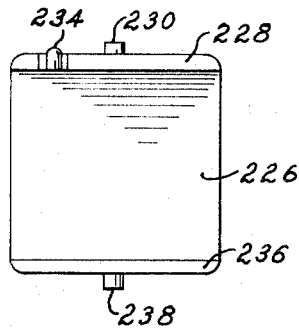
FIG. 15 is an elevational view of the deflector as viewed in the direction of the arrow in FIG. 14.

As best shown in FIGS. 13-16, vane 224 comprises a generally U-shaped member, the central portion 226 of which serves as the closure for outlet 220 and also as an air deflecting vane in the open position of vane 224. Portion 226 is curved to conform to the curvature of the associated wall 26 in the closed position of the vane as best seen in FIG. 14. An upper leg 228, which is generally triangular in shape, extends horizontally inwardly from the central portion 26 (when vane 224 is oriented in operative position). Leg 228 has a journal trunnion 230 projecting integrally upwardly therefrom which is received in a companion hole in a gusset plate 232. Plate 232 is molded as a separate piece and adhesively secured to the shroud immediately above associated outlets 220 and 222, as best seen in FIG. 6. Upper leg 228 also has an upwardly projecting rounded detent pin 234 adapted to selectively engage one of three recesses provided in the underside of plate 232 to selectively but releasably retain vane 224 in closed and variably open positions. Recesses 235 are shown in FIG. 16 wherein the deflector vane assembly is shown inverted from its normal mounted position. The lower leg 236 of vane 224 projects horizontally inwardly from the lower edge of portion 226 and is of generally triangular shape. Leg 236 also has a trunnion pin 238 dependent therefrom for reception in a hole in a boss 240 provided in the bottom wall 24 of shroud 22 (FIG. 14).

With the above arrangement, vane 224 may be manually manipulated from the exterior of the shroud by pushing on portion 226 to thereby pivot it from its closed position shown in FIGS. 6 and 14 to a half-open position wherein detent 234 registers with a central recess 235 in the row of three recesses or to a full open position as shown in FIG. 16 wherein portion 226 is oriented at about 60° to the direction of air flow in passageway 71 of the shroud. By mounting plate 232 in cantilever fashion to the side wall of the shroud and providing detent 234 relatively close to the pivot point 230, the resilience of plate 232 may be relied upon as a spring; i.e., detent 234 will cam plate 232 upwardly when the detent is traveling from one recess to another during pivotal movement of vane 224. This feature also permits snap-in assembly of vane 224 when inserting trunnions 230 and 238 in their respective sockets.

RETURN AIR INTAKE GRILL

Figure 1:
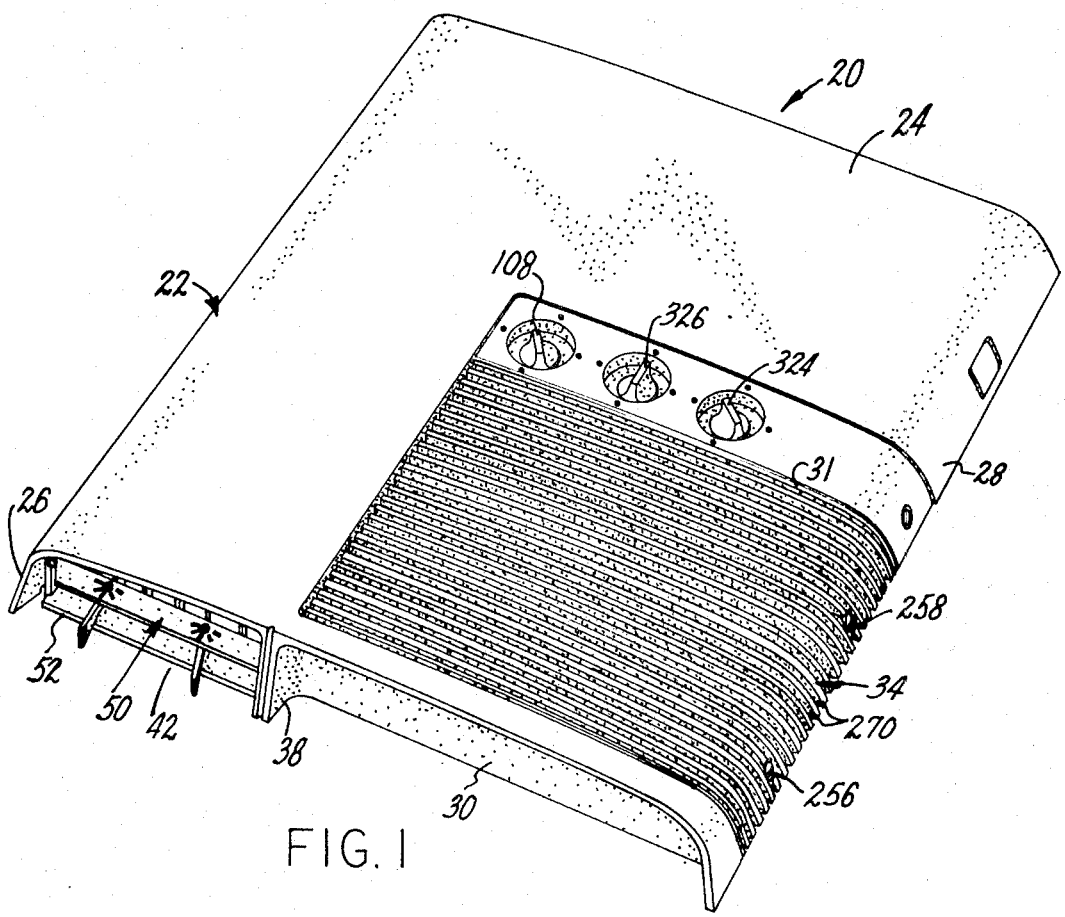
FIG. 1 is a perspective view of an improved air distribution unit constructed in accordance with the present invention, the same being viewed upside down from its customary ceiling-mounted position but showing the exterior surfaces exposed to view from below within the space being cooled.
Figure 2:
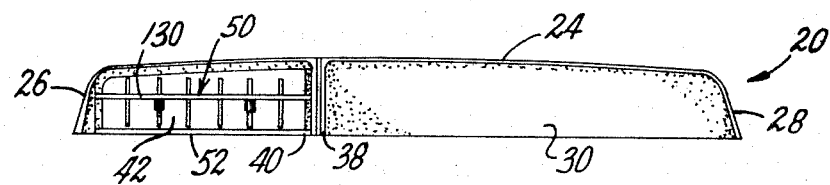
FIG. 2 is a vertical elevational view of the front end of the unit, the opposite rear end being identical in exterior appearance.

Grill 34 mentioned previously is a one-piece member, preferably injection molded of the aforementioned high-impact styrene material, which has a detachable hinge connection to shroud 22. As best seen in FIG. 7, this connection is provided by an L-shaped end flange 250 formed on grill 34, the end lip of which protrudes downwardly in the closed position of the grill so as to overlap or hook over another L-shaped flange 252 provided on shroud 22 adjacent the inner partition wall 40 on the side thereof remote from the passageway 71. The free end 254 of grill 34 is curved to match the curvature of the associated side wall 28, as best seen in FIGS. 1 and 7, and is provided with two quarter-turn fastener screws 256 and 258. These screws are adapted to be inserted into and engage complimentary quarter-turn sockets 260 and 262 respectively (FIG. 6) which in turn are mounted on integral indented platforms 264 and 266 respectively of an indented portion 28' which forms a continuation of wall 28 bridging one side of the return air intake opening 31. Thus in the closed position of grill 34, the free end of the grill is secured by the quarter-turn fasteners to portion 28', and the inner edge of the grill is held by flange 250 overlapping flange 252. When it is desired to clean the grill, screws 256 and 258 are disengaged from sockets 260 and 262, thereby allowing the free end to swing down as shown in FIG. 7, at which point flange 250 can be lifted above flange 252 and the grill completely removed from shroud 22. This procedure is reversed to reinstall the grill and return it to closed position.

Grill 34 is particularly well adapted for easy cleaning because of the offset arrangement of its louvers. The exterior louvers 270 (best seen in FIGS. 1, 3 and 5) of grill 34 are arranged in spaced-apart parallel relation with one another and extend perpendicular to the direction of air flow from the outlets 48 and 42. The interior louvers 272 (best seen in FIGS. 3 and 6) extend perpendicular to louvers 270 and are integrally connected at their lower edges to the upper surfaces of louvers 270, the interior louvers 272 thus serving as bracing and strengthening supports for the exterior louvers 270. With this arrangement, exterior louvers 270 do not project into the spaces defined between interior louvers 272, and vice versa. Therefore, it is an easy matter to sweep a brush along louvers 270 to remove dust and lint, there being no pockets formed by the perpendicularly related interior and exterior louvers to make the grill difficult to clean.

Preferably, grill 34 is provided with a series of three posts 276, 278 and 280 along each side edge which project upwardly from the interior thereof so that three rubber bands 282 may be strung from laterally opposite posts to serve as removable retainers for a suitable foam filter pad 284 which is laid upon interior ribs 272. This facilitates removal of the filter for washing, as well as cleaning of the interior side of grill 34, and provides noise-free retention of the filter.

MOUNTING OF SHROUD

Figure 3:
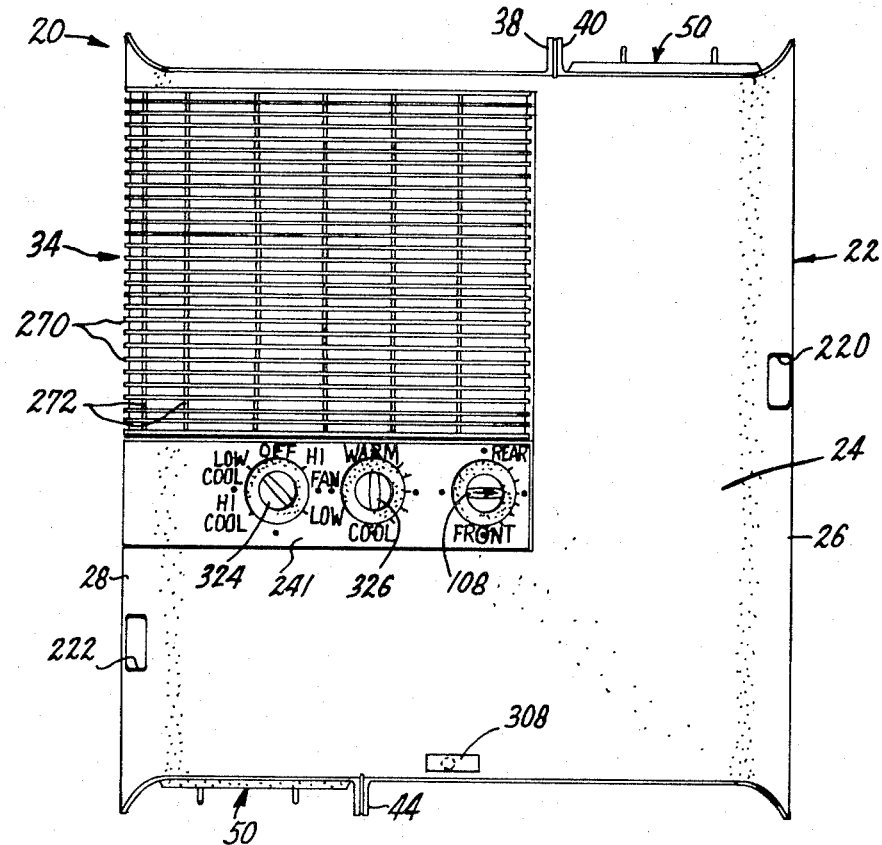
FIG. 3 is a plan view of the air distribution unit FIG. 1 as viewed from directly beneath the unit when installed against the ceiling of the space to be cooled.
Figure 4:
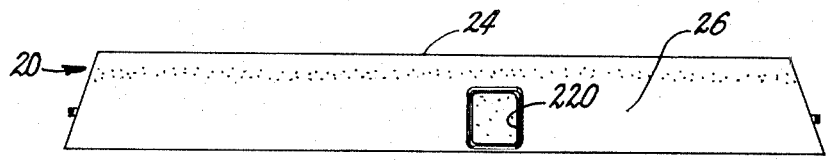
FIG. 4 is an elevational view of the right-hand side of the air distribution unit as viewed in FIG. 3.
Figure 5:
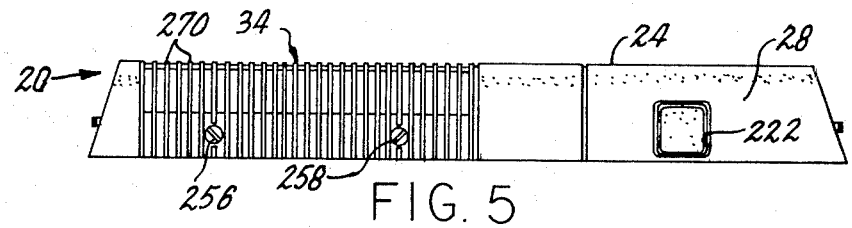
FIG. 5 is an elevational view of the left-hand side of the air distribution unit as viewed in FIG. 3.

Shroud 22 is provided with three mounting bosses 300, 302 and 304 (FIG. 6) arranged on a fore and aft center line 306 of shroud 22 extending midway between side walls 26 and 28. Bosses 300 and 302 are disposed on opposite sides of the return air intake opening 31 of the shroud and extend inwardly thereover so as to locate the respective screw holes 300' and 302' in vertical alignment over the opening covered by grill 34. The remaining boss 304 is hollow and has its screw hole 304' vertically aligned with a removable name plate 308 (FIG. 3). Plate 308 is secured on the exterior surface of wall 24 over the access aperture leading to the interior of boss 304 after installation of unit 20 against the ceiling structure 82. Thus with grill 34 removed during installation of shroud 22, access is obtainable from beneath the unit for installation of the two mounting screws which go through the bosses 300 and 302 and likewise with plate 308 removed access is available to boss 304. After installation, the mounting screws are concealed by grill 34 and name plate 308.

As best seen in FIG. 7, the arrangement of the mounting bosses on a central line parallel to the fore and aft direction of flow of air from the outlets 42 and 48 is advantageous in mounting unit 20 since it can fit against a ceiling structure which may have some concavity or which may be flat. In either event, when the mounting screws are drawn up tightly, the upper surfaces of bosses 300, 302 and 304 will be pulled flush against surface 82. If surface 82 is concave as indicated in FIG. 7, the upper edges of side walls 26 and 28 will engage surface 82 prior to the upper surfaces of the mounting bosses. Then as the bosses are pulled into contact with surface 82, shroud 22 will flex or bend about line 306 to accommodate this curvature of the ceiling mounting surface. A concavity of as much as one-quarter to one-half inch may be accommodated by the semi-flexible nature of the plastic shroud 22 without affecting the operation of its component parts or its efficiency in distributing air to and from the roof-mounted air conditioner. This slight distortion of the shroud also serves to provide a spring-tight mount of the unit against the ceiling which further reduces any chance of noises or rattling after installation.

CONTROL CHAMBER

As indicated previously, a control chamber 230 (FIG. 6) is provided within the interior of shroud 22 in the space between grill 34, interior partition 64, interior partition 57 and side wall 28. This space is adapted to receive a combined junction box and control unit 322 (FIG. 17) which is associated with the air conditioner and mounted to ceiling structure 82. Box 322 has a pair of control knobs 324 and 326 (FIGS. 1, 3 and 17) which in the mounted condition of shroud 22 are respectively received within hollow interior of a pair of cylindrical bosses 328 and 330 which protrude upwardly from wall 24. Relatively wide clearances are provided between these control knobs and the interior walls of bosses 328 and 330 to compensate for installation misalignment. Because of the recessed nature of the knobs, such misalignment is not readily apparent after the unit has been installed. Another advantage of this arrangement is that shroud 22 can be removed from the ceiling structure 82 merely by loosening its three mounting screws while leaving the control box 322 mounted to the ceiling and with its electrical connections to the air conditioner intact. The air conditioner thus can be run without the air distribution unit attached to the ceiling. This greatly facilitates servicing as well as installation of the air conditioner, associated duct work and shroud 22.

CONCLUSION

From the foregoing description, it will now be apparent that the air distribution unit of the invention is economical to manufacture by injection molding processes and involves a minimum of separate parts, thereby greatly reducing assembly procedures and contributing to reliability, long life and rattle-free operation of the air distribution unit. One commercially successful unit constructed in accordance with the invention measures approximately 22 inches in length fore and aft of the unit, about 20 inches in width and about a-⅓ inches in depth, and yet with all of its associated parts weighs only 35 pounds. Hence the unit is easy to lift and install overhead against the ceiling of a mobile or motor home. The air distribution unit 20, because of its unique arrangement of the cool air distribution passageway 71 wrapping around the return air inlet passageway 83 in the S-shaped fashion described previously, provides maximum utilization of space which contributes to the compactness of the unit. Nevertheless, maximum versatility is obtained because cool air can be distributed as desired according to the user's requirements with a high degree of adjustability relative to the cooled air discharge outlets. For example, when installed on the ceiling of a motor home, front outlet 42 can be adjusted to receive all of the cool air by positioning paddle 86 in the F position shown in FIG. 6 and closing the side outlet 220 in wall 226. This then will cause all of the cooled air to be directed forwardly along the ceiling of the motor home toward the driver's compartment to provide maximum cooling of the forward portion of the motor home, a desirable feature when traveling along the highway. At nighttime when the motor home is parked, paddle 86 may be adjusted to the R position to direct all of the cooled air through rear outlet 48 to better cool the rearwardly located sleeping quarters in the vehicle. Of course, any intermediate apportionment is obtainable by suitably positioning paddle 86 between its extreme positions. Likewise, cooling of the kitchen or dining compartment, which normally are located laterally adjacent the air conditioner location, can be obtained as desired by suitably adjusting the side deflectors 224 described previously. Directional adjustment is possible at all of the outlets through manual manipulation of louver assemblies 50 or deflectors 224. The deflectors and diverters are essentially snap-in-place or drop-in-place one-piece assemblies with no retaining fasteners required, thereby greatly reducing noise and assembly costs, as well as the cost of manufacture of the parts themselves. Likewise, when servicing unit 20, removal of the same from the ceiling frees bridge retainer members 52 so they can be merely lifted out of their installed position, and then the louver assemblies 50 can also be lifted out for ready replacement. The same is true of paddle assembly 84. The S-shaped cool air distribution passageway 71 also provides maximum width air ducts in a compact unit, thereby contributing to air distribution efficiency. The air deflector 84 also tends to minimize air flow noise in passageway 71, as does the foam lining of the passageway.

I claim:

1. An air distribution unit for use in a space to be heated or cooled and wherein a return air duct is provided for drawing air from the space to be heated or cooled and an air supply duct is also provided for conducting heated or cooled air to the heated or cooled space, said air distribution unit comprising a shroud having first and second juxtaposed side walls, first and second juxtaposed end walls extending between said side walls and a generally flat exterior wall joined to said side and end walls, said shroud being generally open at one end thereof opposite said exterior wall, the edges of the side and end walls at said one end being adapted for a generally flush mounting of the shroud with its open end against an interior surface of the heated or cooled space, said shroud having an interior wall defining with said first end and side walls an air return passageway adapted to register with the return air duct, said exterior wall of said shroud having a return air intake opening registering with said shourd air return passageway to provide communication between the return air duct and the heated or cooled space, said shroud also having a first air discharge outlet in said first end wall, a second air discharge outlet located in said second end wall diagonally opposite said first discharge outlet and an air distribution passageway extending between said first and second discharge outlets and between said interior wall and said second side and end walls, and an air deflector means disposed in said air distribution passageway adapted to register with the air supply duct for directing air flowing from the air duct into one or both of two paths extending from said deflector means to said first and second discharge outlets respectively.

2. The air distribtuion unit set forth in claim 1 wherein said air deflector means comprises a paddle having generally V-shaped cross section oriented with its vertex facing the cooled air supply duct, and including means supporting said paddle for pivotal movement between first and second angularly spaced positions in said air distribution passageway to thereby variably apportion the amount of air directed by said paddle into said first and second paths of said air distribution passageway.

3. The air distribution unit set forth in claim 2 wherein said paddle support means comprises a cylindrical hub connected to one end of said paddle and having an annular row of teeth projecting therefrom, a cylindrical post projecting interiorly from said exterior wall of said shroud in telescopic and relatively rotatable engagement with said hub, detent means adapted to register with said teeth for maintaining said paddle in a selected angular position, and means yieldably biasing said hub to maintain the engagement of said detent with said teeth whereby said hub may be manually shifted axially of said post to disengage said detent and teeth for rotating said paddle between said first and second positions thereof.

4. The air distribution unit set forth in claim 3 wherein said hub has an open end receiving said post therein, and a transverse interior wall adapted to abut the interior end of said post in the registered condition of said teeth and detent means.

5. The air distribution unit set forth in claim 4 wherein said post is hollow and said wall has a control knob affixed thereto recessed within said hollow post and accessible from the exterior side of said shroud via said hollow post.

6. The air distribution unit set forth in claim 3 wherein said distribution passageway has a central bend disposed diagonally of said shroud opposite said warm air return passageway and wherein said hub is located generally at the center of curvature of said bend adjacent the innermost corner of said warm air return passageway.

7. The air distribtuion unit set forth in claim 1 wherein said first and second discharge outlets each include multiple vane louver means movable about two perpendicular axes for directing the air discharged from said first and second outlets.

8. The air distribution unit set forth in claim 7 wherein each said louver means comprises a main vane extending longitudinally parallel to said exterior wall of said shroud with means at its opposite ends for journalling said main vane on said shroud for pivotal movement about an axis extending parallel to the associated end wall, and a plurality of auxiliary vanes hinged to the inner edge of said main vane for pivotal movement in unison about axes disposed perpendicular to the rotational axis of said main vane.

9. The air distribution unit set forth in claim 8 including a link means connecting each of said auxiliary vanes to an adjacent auxiliary vane, said link means being hingedly connected to the inner edge of said adjacent auxiliary vanes to thereby form a parallel linkage via said adjacent vanes with the inner edge of said main vane.

10. The air distribution unit set forth in claim 9 wherein said louver means has a manually operable control arm extending parallel to said main vane and operably connected to one of said auxiliary vanes with a free end of said arm projecting from the exterior end of the associated discharge outlet, said arm being pivotable about a first axis perpendicular to said main vane for adjusting the angular position of said auxiliary vanes.

11. The air distribution unit set forth in claim 10 wherein said control arm and said main vane have cooperating interengaging slot and pin means for limiting the pivotal movement of said arm about said first axis.

12. The air distribution unit set forth in claim 10 wherein said control arm and said main vane have cooperating interengaging slot and pin means for limiting the pivotal movement of said arm about said first axis, and wherein said arm is flexible in the direction of the pivot axis to enable movement of the free end thereof toward and away from said main vane, said main vane having an arcuate row of recesses and said arm having a projection adapted to selectively register with said recesses for maintaining said arm and auxiliary vanes in a selected angular position, said projection being disengageable with said recesses by flexure of the free end of said arm away from said main vane.

13. The air distribution unit set forth in claim 11 wherein said main vane and said auxiliary vanes are molded as an integral one-piece unit from a flexible plastic material with living hinge portions joining said auxiliary vanes with said main vane and said links with said auxiliary vanes, said hinge portions comprising relatively thin portions of said one-piece unit.

14. The air distribution unit set forth in claim 13 wherein said arm is molded integrally with the associated auxiliary vane and has a connecting hinge portion extending between the interior end of said arm and the rear edge of the associated auxiliary vane, said arm having a slot therethrough receiving said associated auxiliary vane therethrough to provide the operable connection therebetween.

15. The air distribution unit set forth in claim 7 wherein said means journalling said louver means on said shroud comprises a pair of spaced upright walls defining the opposite side walls of the associated discharge outlet of said shroud, each of said walls having a notch with a semi-circular groove at the inner edge of said notch, said main vane having a disc portion at each of the opposite ends thereof adapted to individually seat in the semi-circular groove of the associated notch, and a removable retainer bridge having a pair of end walls individually receivable in the notches of said outlet side walls and having semi-circular recesses therein registering with the semi-circular recesses in said notch to provide therewith a journal cavity for the associated disc of said horizontal vane.

16. The air distribution unit set forth in claim 15 wherein said end walls of said bridge axially overlap said side walls of said outlet to prevent movement of said bridge axially of said outlet to thereby trap said louver means against movement in the direction of the rotational axis of said main vane.

17. The air distribution unit set forth in claim 16 wherein said discs of said main vane and said dependent walls of said bridge having cooperating interengageable detent means for yieldably maintaining said main vane in selected angular positions.

18. The air distribution unit set forth in claim 1 wherein said shroud has a perforate grill movably mounted in said return air intake opening, said grill comprising a first series of parallel louvers spaced from one another and a second series of parallel louvers spaced from one another and connected to said first set of louvers and extending transversely thereto, said first and second sets of louvers being disposed in mutually offset relation relative to one another in the direction of air flow through said grill such that said first set of louvers are clear of the spaces defined between said second set of louvers, and vice versa, to thereby facilitate cleaning of said louvers.

19. The air distribution unit set forth in claim 18 wherein said grill has a filter detachably secured to the interior side of the grill.

20. The air distribution unit set forth in claim 18 wherein said grill has an L-shaped flange extending along one edge thereof and wherein said shroud has a protruding rib loosely received in the space defined by said L-shaped flange to form a disconnectable hinge between said shroud and said grill.

21. The air distribution unit set forth in claim 18 wherein said grill has an L-shaped flange extending along one edge thereof and wherein said shroud has a protruding rib loosely received in the space defined by said L-shaped flange to form a disconnectable hinge between said shroud and said grill, and wherein said rib is located adjacent said inner wall of said such that said grill is pivotable about an axis extending parallel to said side walls of said shroud between a closed position flush with said exterior wall and an outwardly inclined open position, said grill being detachable from said shroud by lifting said flange over said rib when the grill is pivoted toward its open position.

22. The air distribution unit set forth in claim 1 wherein at least one of said side walls has a lateral air discharge opening therein registering with said air distribution passageway, and including a movable deflector vane mounted on said shroud for pivotable movement between a position closing the associated outlet and a position wherein said vane opens said outlet and protrudes into the airstream in said distribution passageway for deflecting a portion of the airstream laterally out of the shroud via the associated side outlet.

23. The air distribution unit set forth in claim 22 wherein said deflector vane comprises a generally U-shaped member with the center of the U defining the air deflecting vane and the legs of the U being parallel and each having a trunnion, said member being made of semi-resilient material, said shroud having a pair of journals for receiving said trunnions of said legs with a snap-in fit, one of said legs having a detent protruding therefrom selectively registerable with a spaced row of recesses in an adjacent portion of said shroud.

24. The air distribution unit set forth in claim 22 wherein said deflector vane comprises a generally U-shaped member with the center of the U defining the air deflecting vane and the legs of the U being parallel and each having a trunnion, said member being made of semi-resilient material, said shroud having a pair of journals for receiving said trunnions of said legs with a snap-in fit, one of said legs having a detent protruding therefrom selectively registerable with a spaced row of recesses in an adjacent portion of said shroud, and wherein each of said heated or side walls has one of said lateral cool air discharge openings and an associated deflector vane as defined in claim 23.

25. The air distribution unit set forth in claim 1 wherein said shroud is made of plastic material having at least some flexibility about a bending axis extending between said side walls and perpendicular to said front and rear walls of said shroud, the edges of said side and end walls and said interior partition of said shroud adjacent the open end thereof being generally flush in the free condition of said shroud, and means for removably mounting said shroud to an interior mounting surface of the structure defining said cooled space comprising a series of bosses located in alignment with said bending axis adapted to receive mounting fasteners therethrough whereby when said fasteners are tightened said shroud can flex about said bending axis to accommodate slight curvature in the interior mounting surface.

26. The air distribution unit set forth in claim 1 wherein said shroud has a control chamber therein disposed between said return air intake opening and said second end wall, said control chamber having at least one cylindrical hub protruding inwardly from said exterior wall of said shroud and open at both ends to receive a control member therein.

* * * * *

PO-1050
(5/69)

UNITED STATES PATENT OFFICE
CERTIFICATE OF CORRECTION

Patent No. 3,727,537          Dated April 17, 1973

Inventor(s) Millard Fillmore Harty, Jr.

It is certified that error appears in the above-identified patent and that said Letters Patent are hereby corrected as shown below:

Column 12, line 62 - cancel "warm"

Column 12, line 64 - cancel "warm"

Column 15, line 24 - cancel "heated or"

Column 15, line 25 - cancel "cool"

Column 16, line 11 - after "said" insert --heated or--

Signed and sealed this 18th day of December 1973.

(SEAL)
Attest:

EDWARD M. FLETCHER, JR.
Attesting Officer

RENE D. TEGTMEYER
Acting Commissioner of Patents

UNITED STATES PATENT OFFICE
CERTIFICATE OF CORRECTION

Patent No. 3,727,537  Dated April 17, 1973

Inventor(s) Millard Fillmore Harty, Jr.

It is certified that error appears in the above-identified patent and that said Letters Patent are hereby corrected as shown below:

Column 2, line 17 - cancel "lower" and insert --louver--; Column 4, line 10 - cancel "64" and insert --34--; Column 4, line 13 - cancel "64" and insert --34--; Column 4, line 64 - cancel "16" and insert --17--; Column 6, line 60 - cancel "10" and insert --12--; Column 6, line 61, cancel "12" and insert --10--; Column 10, line 32, cancel "230" and insert --320--.

Claim 2 (column 12, line 32) cancel "said first and second" and insert --one or both of said two--.

Claim 15 (column 14, line 12) cancel "horizontal" and insert --main--.

Claim 21 (column 14, line 54) cancel "inner" and insert --interior--; after "said" (second occurrence) insert --shroud--

Claim 24 (column 15, lines 24 and 25) cancel "one of" and insert --a--; cancel "openings" and insert --opening--; cancel "an as-"; (column 16, line 1) cancel "sociated"; cancel "as defined in claim 23" and insert --associated therewith--.

Claim 25 (column 16, lines 5 and 6) cancel "front and rear" and insert --end--

Signed and sealed this 23rd day of July 1974.

(SEAL)
Attest:

McCOY M. GIBSON, JR.
Attesting Officer

C. MARSHALL DANN
Commissioner of Patents